(12) United States Patent
Shellshear

(10) Patent No.: US 8,090,712 B2
(45) Date of Patent: Jan. 3, 2012

(54) METHOD FOR NAVIGATING LARGE IMAGE SETS USING SORT ORDERS

(75) Inventor: Andrew John Shellshear, Marrickville (AU)

(73) Assignee: Canon Kabushiki Kaisha, Tokyo (JP)

(*) Notice: Subject to any disclaimer, the term of this patent is extended or adjusted under 35 U.S.C. 154(b) by 395 days.

(21) Appl. No.: 11/687,284

(22) Filed: Mar. 16, 2007

(65) Prior Publication Data

US 2007/0270985 A1  Nov. 22, 2007

(30) Foreign Application Priority Data

May 16, 2006  (AU) .............................. 2006202063

(51) Int. Cl.
*G06F 7/00* (2006.01)
*G06F 17/30* (2006.01)
*G06F 3/00* (2006.01)
*G06F 3/048* (2006.01)

(52) U.S. Cl. ........ 707/723; 707/748; 707/752; 715/723; 715/766; 715/794

(58) Field of Classification Search .................. 707/100, 707/723, 748, 752; 715/723, 766, 794
See application file for complete search history.

(56) References Cited

U.S. PATENT DOCUMENTS

| | | | | |
|---|---|---|---|---|
| 4,939,639 A * | 7/1990 | Lee et al. | ........................... | 707/7 |
| 5,774,121 A * | 6/1998 | Stiegler | ........................ | 715/769 |
| 5,828,375 A * | 10/1998 | Nomura et al. | ............... | 715/764 |
| 6,018,735 A * | 1/2000 | Hunter | .............................. | 707/5 |
| 6,121,969 A * | 9/2000 | Jain et al. | ....................... | 715/850 |
| 6,201,886 B1 * | 3/2001 | Nakayama | ..................... | 382/124 |
| 6,278,497 B1 * | 8/2001 | Sumiyoshi et al. | ........... | 348/722 |
| 6,904,410 B1 * | 6/2005 | Weiss et al. | ..................... | 705/27 |
| 7,162,511 B2 * | 1/2007 | Lunenfeld | ..................... | 709/203 |
| 7,165,091 B2 * | 1/2007 | Lunenfeld | ..................... | 709/203 |
| 7,477,780 B2 * | 1/2009 | Boncyk et al. | ................ | 382/165 |
| 7,734,622 B1 * | 6/2010 | Fitzhugh | ....................... | 707/722 |
| 2001/0014184 A1 * | 8/2001 | Bubie et al. | .................. | 382/293 |
| 2003/0026507 A1 * | 2/2003 | Zlotnick | ....................... | 382/311 |
| 2003/0069900 A1 * | 4/2003 | Hind et al. | .................... | 707/200 |
| 2003/0084065 A1 * | 5/2003 | Lin et al. | ..................... | 707/104.1 |
| 2003/0114946 A1 * | 6/2003 | Kitchen | .......................... | 700/97 |
| 2003/0123737 A1 * | 7/2003 | Mojsilovic et al. | ........... | 382/224 |
| 2004/0117402 A1 | 7/2004 | Tateson et al. | | |

(Continued)

OTHER PUBLICATIONS

Webshots (www.webshots.com), Version Jun. 12, 2004, Retrieved from http://web.archive.org/web/20040612114703/www.webshots.com/g/ on May 20, 2009.*

(Continued)

*Primary Examiner* — Rehana Perveen
*Assistant Examiner* — Mark Hershley
(74) *Attorney, Agent, or Firm* — Fitzpatrick, Cella, Harper & Scinto

(57) ABSTRACT

A method of displaying items from a collection of items including a first item is provided. The method determines a first sort order of the collection, and at least one alternate sort order of the collection. At least items adjacent to the first item in the first sort order, and in the alternate sort order, are then compared. The method then displays a portion of the items associated with the first item in each of the first sort order and in the alternate sort order based on the comparison.

17 Claims, 15 Drawing Sheets

U.S. PATENT DOCUMENTS

| | | | |
|---|---|---|---|
| 2004/0193524 A1* | 9/2004 | Almeida et al. | 705/36 |
| 2005/0060222 A1* | 3/2005 | White | 705/10 |
| 2005/0099497 A1* | 5/2005 | Rogan et al. | 348/207.2 |
| 2005/0168460 A1* | 8/2005 | Razdan et al. | 345/419 |
| 2005/0246327 A1* | 11/2005 | Yeung et al. | 707/3 |
| 2006/0074973 A1* | 4/2006 | Platt et al. | 707/102 |
| 2006/0112408 A1 | 5/2006 | Crew et al. | |
| 2006/0155684 A1* | 7/2006 | Liu et al. | 707/3 |
| 2006/0212317 A1* | 9/2006 | Hahn et al. | 705/3 |
| 2006/0271390 A1* | 11/2006 | Rich et al. | 705/1 |
| 2006/0288002 A1* | 12/2006 | Epstein et al. | 707/6 |
| 2007/0098303 A1* | 5/2007 | Gallagher et al. | 382/305 |
| 2007/0223839 A1* | 9/2007 | Kisilev et al. | 382/286 |
| 2009/0043798 A1* | 2/2009 | Tan et al. | 707/102 |

* cited by examiner

Fig. 9A
Sort order 1: A, B, C, D, E, F  ← 901
Sort order 2: E, B, C, D, F, A  ← 902
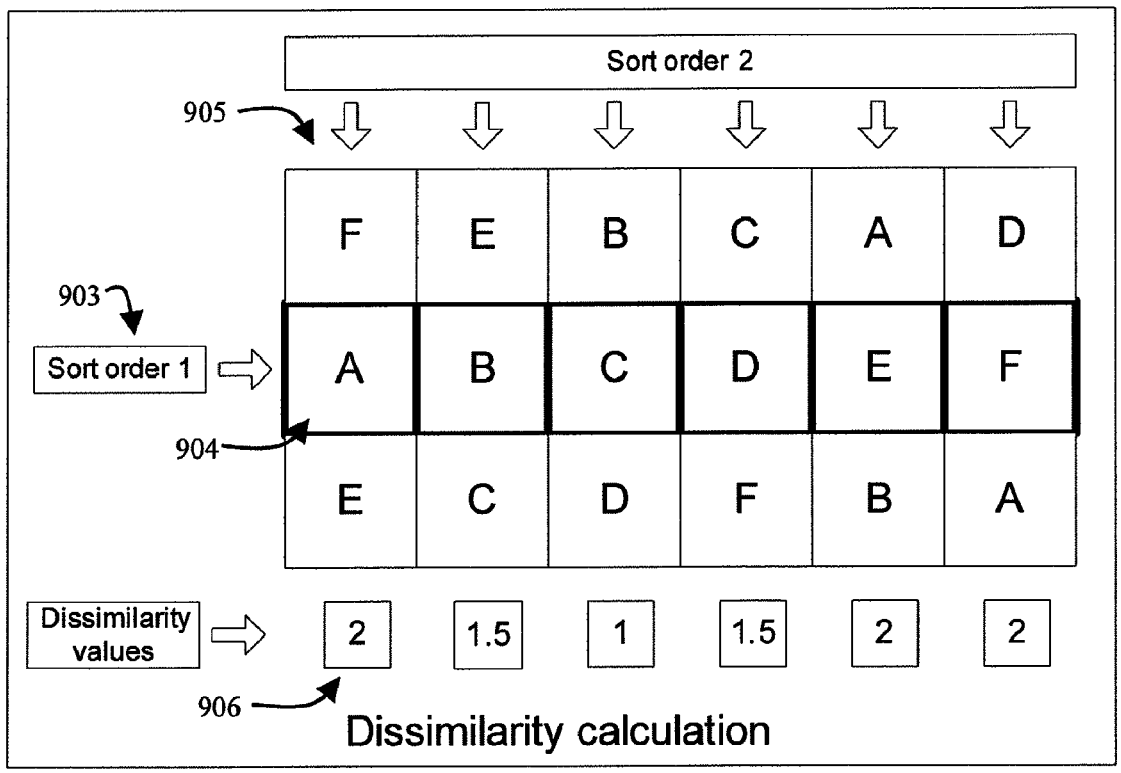
Fig. 9B
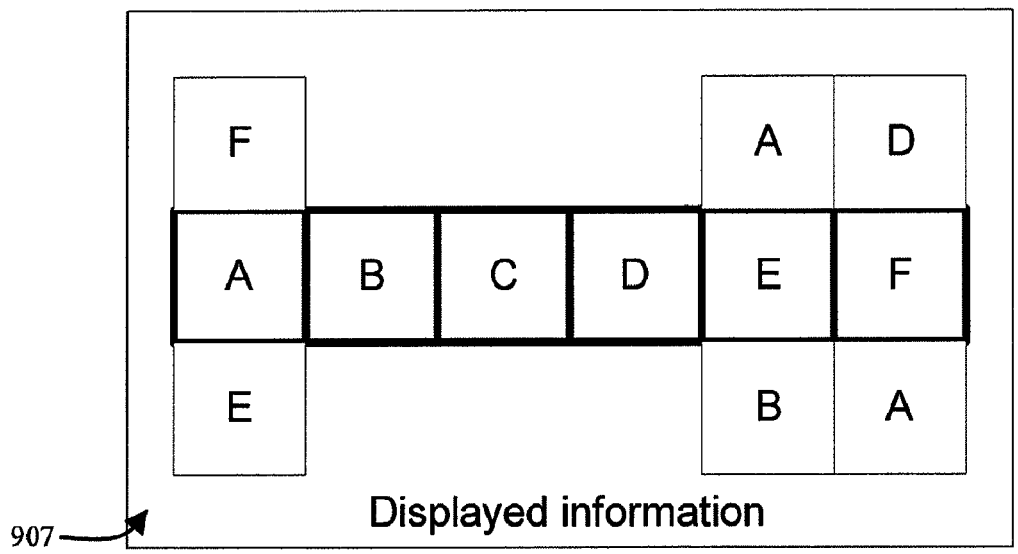
Fig. 9C

Item A

| Sort 1 | Sort 2 | Weights |
|---|---|---|
| B | E | |
| C | B | |
| D | C | |
| E | D | 0.5 |
| F | F | 0 |
| A | A | |
| B | E | 1 |
| C | B | 0.5 |
| D | C | |
| E | D | |
| F | F | Total: 2 |

Item B

| Sort 1 | Sort 2 | Weights |
|---|---|---|
| C | C | |
| D | D | |
| E | F | |
| F | A | 0.5 |
| A | E | 1 |
| B | B | |
| C | C | 0 |
| D | D | 0 |
| E | F | |
| F | A | |
| A | E | Total: 1.5 |

Item C

| Sort 1 | Sort 2 | Weights |
|---|---|---|
| D | D | |
| E | F | |
| F | A | |
| A | E | 0.5 |
| B | B | 0 |
| C | C | |
| D | D | 0 |
| E | F | 0.5 |
| F | A | |
| A | E | |
| B | B | Total: 1 |

Item D

| Sort 1 | Sort 2 | Weights |
|---|---|---|
| E | F | |
| F | A | |
| A | E | |
| B | B | 0 |
| C | C | 0 |
| D | D | |
| E | F | 1 |
| F | A | 0.5 |
| A | E | |
| B | B | |
| C | C | Total: 1.5 |

Item E

| Sort 1 | Sort 2 | Weights |
|---|---|---|
| F | B | |
| A | C | |
| B | D | |
| C | F | 0.5 |
| D | A | 1 |
| E | E | |
| F | B | 1 |
| A | C | 0.5 |
| B | D | |
| C | F | |
| D | A | Total: 2 |

Item F

| Sort 1 | Sort 2 | Weights |
|---|---|---|
| A | A | |
| B | E | |
| C | B | |
| D | C | 0.5 |
| E | D | 1 |
| F | F | |
| A | A | 0 |
| B | E | 0.5 |
| C | B | |
| D | C | |
| E | D | Total: 2 |

Fig. 10

METHOD FOR NAVIGATING LARGE IMAGE SETS USING SORT ORDERS

CROSS-REFERENCE TO RELATED PATENT APPLICATIONS

This application claims the right of priority under 35 U.S.C. §119 based on Australian Patent Application No. 2006202063, filed May 16, 2006, which is incorporated by reference herein in its entirety as if fully set forth herein.

FIELD OF THE INVENTION

The current invention relates to the navigation of images in an image viewer and, in particular, to the navigation of large sets of images using sort orders.

BACKGROUND

With the advent of digital cameras, there are increasingly many photographs that exist only in digital form. There are many ways of viewing such photographs including: using a display provided on the camera, downloading the photographs onto a computer and viewing them on the computer screen, and increasingly, viewing them on a television screen. Each approach has its own problems.

A camera display is usually too small for anything but rudimentary viewing purposes. Its advantage is that the images can be viewed almost immediately, and that the images do not need to be transferred onto another device for incidental review. Digital camera screens typically have a poor resolution for viewing digital images captured by the camera.

Images stored on a computer are easy to browse and sort, but frequently have sophisticated and complicated user interfaces (UI) for viewing. It is often inconvenient to view images on a computer screen, especially in a social context, and it usually requires some technical skill with computers to do so. Computer screens typically have a good resolution for viewing digital images.

Browsing on a television is most commonly performed using a remote-control. This is a simple and commonly understood interface, and assumes little or no technical skill. However, a remote-control presents different problems. For example, two dimensional grids are more awkward to navigate, and scrollbars are impractical. The interface presented to a television viewer must be simpler. A simple approach sometimes taken is to display images in a one-dimensional list. This occurs for example in the "menu" screens of many DVD productions, browsed via the television display. It can take a great deal of time to navigate or browse a complete set of images, and it can be difficult and awkward to quickly jump to different places on the list. Televisions typically have a poor resolution for viewing digital pictures, although the more recent high-definition televisions bring the resolution to be nearly as good as computer screens.

These problems are amplified when there are many images. It is increasingly common for people to take many digital photographs, as the cost of doing so is negligible if they are not printed. People may have sets of images in the tens or hundreds of thousands. Managing these sets of photos can be complicated, and is usually done on computers. The most common approach is to break up the images into a number of folders, and to display the images in a folder as a set of thumbnails. However, more recent image management programs (such as iPhoto™ manufactured by Apple Corp.) avoid dividing the images into folders, as it is easy to lose an image in a complicated hierarchy of folders. Despite the fact that there may be tens of thousands of images, such an interface attempts to show all the images as thumbnails in a single scrolling window. In addition, many commercial picture viewers group images into folders, meaning that some images might rarely be viewed, and could be lost in the folder hierarchy. Those picture viewers that allow the display of all images usually use a two-dimensional list with a scrollbar. However, these approaches, which work reasonably well on a computer with its sophisticated user interface, work poorly when implemented on a television and remote-control.

One tool known in the art that allows a user to find images quickly is the search facility. However, search facilities often require detailed input from a user, such as typing a search term. This is often impractical when the user has a limited UI, such as a remote-control. A simple kind of search can be performed using a sort facility. Changing the sort order of a list can be done with relatively few button presses of a remote control, and a user only has to remember one aspect of an image they are looking for. The aspect may include the date or the filename of the image, or even the colour or brightness of the image. The user can sort on that criteria to find the image.

Users browse photo collections not only to find specific images, but also for the general pleasure of browsing. At any given moment, the images being browsed will be in a particular sort order (e.g., sorted by date, title, size, etc.). However, when the user changes the sort order, there is often very little change in what the user sees. Often, images that were taken at the same time will also "look" very similar in other sort orders based upon name, colour, feature, camera metadata, and so on. The lack of useful feedback results in users not changing sort orders, except when searching for a specific image.

SUMMARY OF THE INVENTION

It is an object of the present invention to substantially overcome, or at least ameliorate, one or more deficiencies of existing arrangements.

The disclosed arrangements seek to address this object by providing a mechanism for selecting one or more alternate sort orders to be displayed or otherwise represented simultaneously with an initially selected or primary sort order. This is done by comparing items in the alternate sort orders to seek to identify those alternate sorts that produce a significant difference in the images displayable in the alternate sort orders in comparison to the primary sort order.

According to one aspect of the present disclosure, there is provided a method of displaying items from a collection of items including a first item, the method comprising the steps of:

(a) determining a first sort order of the collection, and at least one alternate sort order of the collection;

(b) comparing at least items adjacent to the first item in the first sort order and the alternate sort order; and (c) displaying a portion of the items associated with the first item in each of the first sort order and in the alternate sort order based on the comparison.

According to another aspect of the present disclosure, there is provided a method of displaying items from a collection of items including a first item, the method comprising the steps of:

(a) determining a first sort order of the collection and at least one alternate sort order of the collection;

(b) displaying a portion of the items in the first sort order associated with the first item;

(c) displaying, physically adjacent to a displayed particular item of the portion, at least one corresponding item of the alternate sort order, the corresponding item being located adjacent the particular item in the alternate sort order.

According to another aspect of the present disclosure, there is provided a graphical user interface for displaying a collection of sortable items, the graphical user interface comprising:

a first display portion configured to display a first subset of items of the collection according to a first sort order associated with a first attribute of the items, the displayed first subset including an item identified as a focus item; at least one further display portion configured to display a corresponding further subset of the collection according to a corresponding alternate sort order associated with a corresponding alternate attribute of the items, the display of the corresponding further subset including the display of a corresponding item of the first subset; and indicia at least indicating an ability to scroll at least one of the displayed sort orders.

Other aspects are also provided.

BRIEF DESCRIPTION OF THE DRAWINGS

At least one embodiment of the present invention will now be described with reference to the drawings, in which:

FIGS. 9A-9C schematically depict how the dissimilarity calculation influences the representation of items in the GUI;

FIG. 10 depicts a schematic view of the calculation of the dissimilarity values for an example of two sorted lists;

DETAILED DESCRIPTION INCLUDING BEST MODE

The arrangements to be described allow the user to quickly navigate a list of items by showing the positions in the list at which a change in sort order would result in an interesting change to the items being presented. This makes it easier and more enjoyable for the user to browse through items, and more likely for the user to serendipitously come across items that otherwise would rarely be viewed. In preferred embodiments, the items being browsed are digital photographs, although they could be any item that has a visual representation, such as book covers, or music album covers, or computer generated images, or text.

Figure 11:
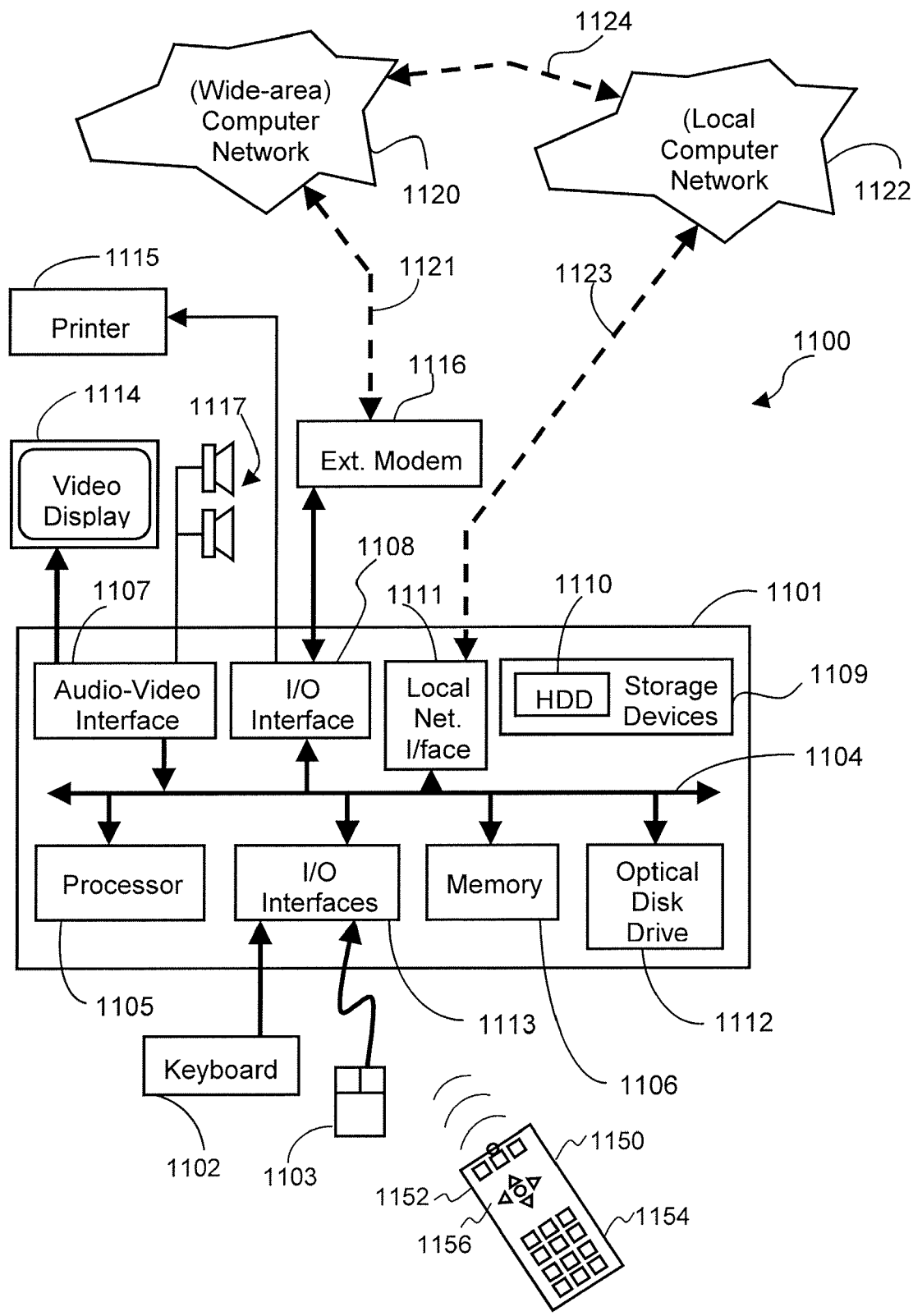
FIG. 11 is a schematic block diagram representation of a computer system which may be used to implement the display of images.

The method of image set browsing and navigation may be implemented using a computer system 1100, such as that shown in FIG. 11 wherein the processes of FIGS. 1-10 and 12-14 may be implemented as software, such as one or more application programs executable within the computer system 1100. In particular, the steps of the method of image browsing and navigation are effected by instructions in the software that are carried out within the computer system 1100. The instructions may be formed as one or more code modules, each for performing one or more particular tasks. The software may also be divided into two separate parts, in which a first part and the corresponding code modules performs the image set navigation methods and a second part and the corresponding code modules manage a user interface between the first part and the user. The software may be stored in a computer readable medium, including the storage devices described below, for example. The software is loaded into the computer system 1100 from the computer readable medium, and then executed by the computer system 1100. A computer readable medium having such software or computer program recorded on it is a computer program product. The use of the computer program product in the computer system 1100 preferably effects an advantageous apparatus for the navigation and browsing of sets of images.

As seen in FIG. 11, the computer system 1100 is formed by a computer module 1101, input devices such as a keyboard 1102 and a mouse pointer device 1103, and output devices including a printer 1115, a display device 1114 and loudspeakers 1117. An external Modulator-Demodulator (Modem) transceiver device 1116 may be used by the computer module 1101 for two-way communication with a communications network 1120 via a connection 1121. The network 1120 may be a wide-area network (WAN), such as the Internet or a private WAN. Where the connection 1121 is a telephone line, the modem 1116 may be a traditional "dial-up" modem. Alternatively, where the connection 1121 is a high capacity (eg: cable) connection, the modem 1116 may be a broadband modem. A wireless modem may also be used for wireless connection to the network 1120.

The computer module 1101 typically includes at least one processor unit 1105, and a memory unit 1106, for example, formed from semiconductor random access memory (RAM) and read only memory (ROM). The module 1101 also includes a number of input/output (I/O) interfaces including an audio-video interface 1107 that couples to the video display 1114 and loudspeakers 1117, an I/O interface 1113 for the keyboard 1102 and mouse 1103 and optionally a joystick (not illustrated), and an interface 1108 for the external modem 1116 and printer 1115. In some implementations, the modem 1116 may be incorporated within the computer module 1101, for example within the interface 1108. The computer module 1101 also has a local network interface 1111 which, via a connection 1123, permits coupling of the computer system 1100 to a local computer network 1122, known as a Local Area Network (LAN). As also illustrated, the local network 1122 may also couple to the wide network 1120 via a connection 1124, which would typically include a so-called "firewall" device or similar functionality. The interface 1111 may be formed by an Ethernet circuit card, a wireless Bluetooth™ or an IEEE 802.21 wireless arrangement.

The interfaces 1108 and 1113 may afford both serial and parallel connectivity, the former typically being implemented according to the Universal Serial Bus (USB) standards and having corresponding USB connectors (not illustrated). Storage devices 1109 are provided and typically include a hard disk drive (HDD) 1110. Other devices such as a floppy disk drive and a magnetic tape drive (not illustrated) may also be used. An optical disk drive 1112 is typically provided to act as a non-volatile source of data. Portable memory devices, such optical disks (eg: CD-ROM, DVD), USB-RAM, and floppy disks, for example, may then be used as appropriate sources of data to the system 1100.

The components 1105 to 1113 of the computer module 1101 typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations, Apple Mac™ or alike computer systems evolved therefrom.

In an alternate implementation, the computer module 1101 may be stand-alone device such as a cable-TV "set-top-box" or other similar device, where the display 1114 is a television display, for example. Such a device may connect directly to the local computer network 1122 or to the wide network 1120, either of which may form a repository for the set of images. In a further alternate implementation, the computer module 1101 may be an audio-visual component such as a DVD player, where the optical drive 1112 is a DVD drive and the set of images may be stored on an optical disk readable by the drive 1112. In these implementations, the keyboard 1102 and the mouse 1103 may be omitted and replaced by a handholdable remote control device 1150 configured to communicate with the I/O interface 1113 by a wireless medium, such as RF communications or infrared communications. The remote-control 1150 is seen to have a number of user-actuable buttons including function buttons 1152 and a keypad 1154 which may be configured to perform desired functions. Also included is a number of scroll and selection buttons 1156 that permit scrolling vertically and horizontally through menus and the selection of desired items, such as images from the collection.

Typically, the application programs discussed above are resident on the hard disk drive 1110 and are read and controlled by the processor 1105. Intermediate storage of such programs and any data fetched from the networks 1120 and 1122 may be accomplished using the semiconductor memory 1106, possibly in concert with the hard disk drive 1110. In some instances, the application programs may be supplied to the user encoded on one or more CD-ROM and read via the corresponding drive 1112, or alternatively may be read by the user from the networks 1120 or 1122. Still further, the software can also be loaded into the computer system 1100 from other computer readable media. The term "computer readable media" refers to any storage medium that participates in providing instructions and/or data to the computer system 1100 for execution and/or processing. Examples of such media include floppy disks, magnetic tape, a CD-ROM, a hard disk drive, a ROM or integrated circuit, a magneto-optical disk, or a computer readable card such as a PCMCIA card and the like, whether or not such devices are internal or external to the computer module 1101. Examples of computer readable transmission media that may also participate in the provision of instructions and/or data include radio or infra-red transmission channels, as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 1114. Through manipulation of the keyboard 1102 and the mouse 1103 or the remote control 1150 as appropriate, a user of the computer system 1100 and the application may manipulate the interface to provide controlling commands and/or input to the applications associated with the GUI(s).

The specific embodiments to be described relate to graphical user interfaces (GUI) executable within the system 1100 for the browsing of digital images accessible via the system 1100, with the GUI and images being displayable upon the display screen 1114. Whilst the system 1100 described above relates to a computer system with the computer display 1114, the system 1100 may also be associated with a television display 1114 where the module 1101 is a set-top box coupled to a cable network having access to the Internet, World Wide Web or a private (eg. home) computer network. Further, the keyboard 1102 may be a keypad on a panel of the set-top box and the mouse 1103 may be substituted by a remote control device, well known in the television and set-top box arts. The images to be browsed and view may be stored in the store 1109, the disk drive 1112, the networks 1120 and 1122 or on portable media (eg. USB RAM) discussed above.

Figure 1:
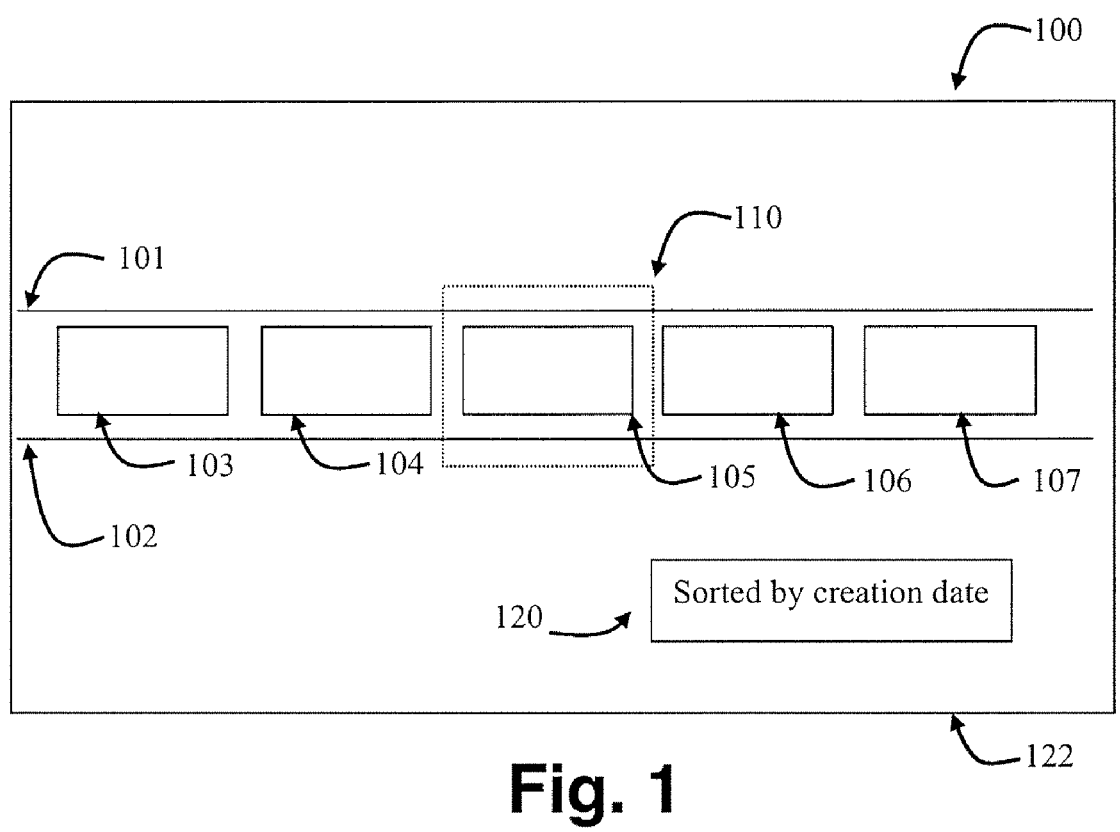
FIG. 1 shows a schematic view of a first approach for the display of images.

FIG. 1 shows a GUI 100 in which a list of images is being viewed. FIG. 1 specifically shows a set of images 103-107 being viewed, the set being a subset of the images in the list. The GUI 100 is bound by a viewing area 122 containing the displayed images 103, 104, 105, 106, and 107 that are arranged in a line within two borders 101, 102. This configuration may be called a "filmstrip" view mode. One image 105 is selected by a user operation of the keyboard 1102 or the mouse 1103 for example, and the selection is indicated by a large rectangle 110 enveloping the selected image 105, which may be considered as a "focus" item. Desirably, the selection rectangle 110 resides at a fixed, preferably central or middle, location in the line of displayed images. There is a text indication 120 as to the current sort order of the list, in this case "by creation date". The user may change which images are displayed by scrolling the images left or right along the line, using a button on the keyboard 1102 or the mouse 1103, or by using the remote-control 1150, or other control means known in the art. Scrolling images through the selection rectangle changes the focus item. The displayed images 103, 104, 105, 106, and 107 are a displayed subset of the images stored or otherwise accessible in the system 1100, these being identified as the "available" images. The available images in the system 1100 are ordered according to a primary attribute (eg: creation date) provided by the indication 120 and are further ordered by other attributes of the images as required when the value of the attributes are the same. This is detailed further in the flowchart of FIG. 4.

There are many possible ways of sorting images, including but not limited to attributes such as the names, sizes, colour, and creation dates of the images. In a preferred implementation, the images are initially sorted according to "creation date", so that images to the left have earlier creation dates than images to the right. Only items having a common attribute may be sorted into an ordered list. For example, where user defined metadata is added to an image, such may be of a type not present in other images. An instance of this may occur where a family adds the metadata "dad", "mum", "boy" and "girl" to photographic images which include the respective family member. Other photographs in the collection may be simple landscapes without any family member present. As such, a sort based upon "mum" would produce a sorted list that excluded all items from the collection that did not include "mum", such as the landscapes.

When the user scrolls the list to the left, image 103 scrolls behind the left hand side of the viewing area 122, and the other images 104, 105, 106 and 107 scroll one place to the left, so that the image 105 in the selected area 110 is replaced by another image, in this case the image 106, which becomes the focus item. A new image scrolls onto the screen from the right hand side of the viewing area 100. Similarly, when the user scrolls the list to the right, image 107 scrolls behind the right hand side of the viewing area 122, and the other images 103, 104, 105 and 106 scroll one place to the right, so that the image 105 in the selected area 110 is replaced by another image, in this case the image 104. A new image scrolls onto the screen from the left hand side of the viewing area 100.

In this way, the user may scroll left or right to view all the images in the list. Desirably, it is always possible to scroll left or right to view further images and this is achieved by displaying the images as a continuous loop, wrapping around from the end of the list to the beginning, and vice versa. Accordingly, when the user is viewing the beginning of the list, such as for the initial sort order of increasing creation date, and for which the left-most image 103 has the oldest creation date, if the user scrolls further to the left, the system allows them to do so and displays the image with the most recent creation date.

The user may also change the current sort order, by pressing a button on the mouse 1103 or a remote-control 1150, or by selecting a key on a keyboard 1102, or other control methods known in the art. The GUI 100 is configured to reorder and display the list in a number of different sort orders. When the user changes the current sort order, the selected image 105 (i.e., the current focus item) within the rectangle 110 does not move. The GUI 100 preserves in memory the selected image 105, performs the re-sort, of the list of images, locates the position of the selected image 105 within the resorted list, and replaces the images to the left 103, 104 and right 106, 107 of the image 105 in the old sort order with the images to the left and right of it in the new sort order. Thus, when the user changes the sort order, the selected image 105 will remain in position but the other images 103, 104, 106, and 107 may typically be replaced by other images from the list according to the new sort order.

In addition to displaying the images in the line and in a continuous loop, allowing the user to scroll left and right along that loop, and allowing the user to change the sort order of the images around the selected image 105, alternate sort orders that are determined are interesting may also be displayed.

Figure 2:
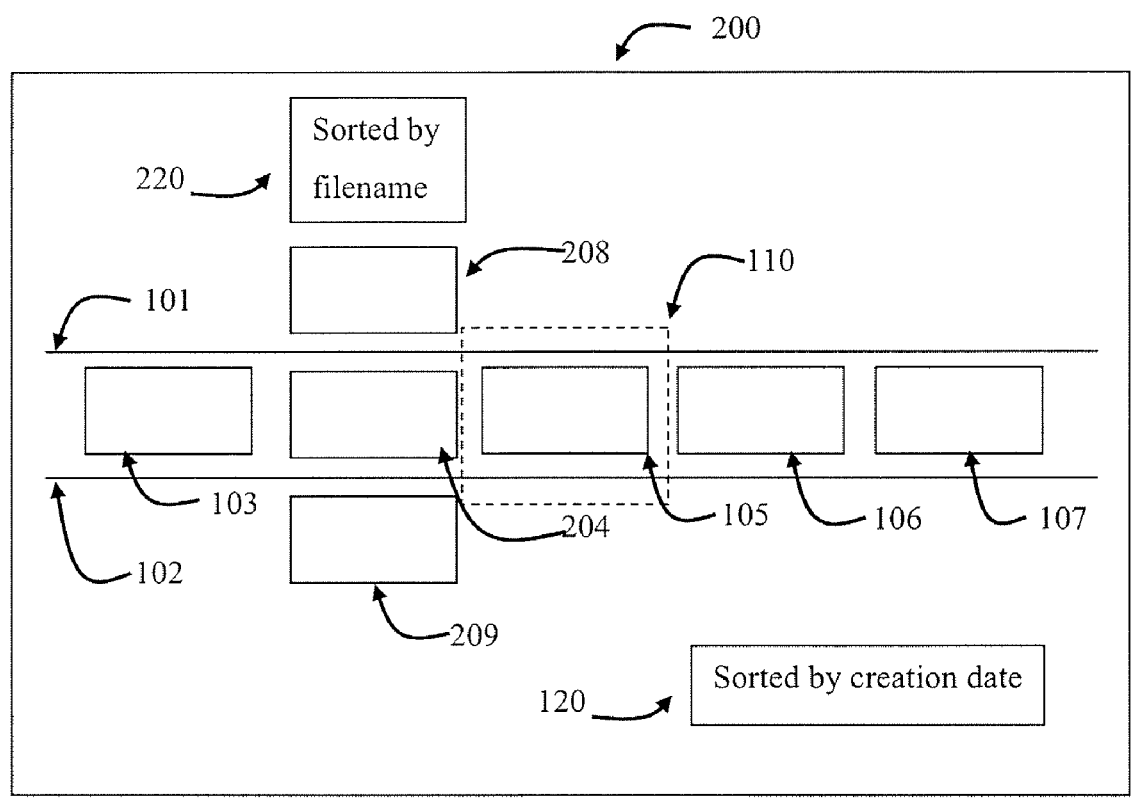
FIG. 2 shows a schematic view of a second approach for the display of an alternate sort order on a given list element, in which the alternate sort adjacent elements are displayed vertically.

FIG. 2 shows a further GUI 200 for the display of an alternate sort order on a list element in addition to a primary sort order. In the GUI 200, adjacent elements in the alternate sort are displayed vertically. In the GUI, one of the images 204 has an alternate sort order displayed. An image 208 is shown above the image 204 and a second image 209 is shown below the image 204. The images 208 and 209 are the adjacent elements of the image 204 in the alternate sort. The GUI 200 includes an indication 220 as to what the alternate sort order represents, in this example by "filename". The image 208 above the image 204 is the image that would be displayed to the left of the image 204 in the alternate sort order 220, and the image 209 below the image 204 is the image that would be displayed to the right of the image 204 in the alternate sort order 220, had such been selected as the primary sort 120 for the "filmstrip" line.

Figure 3:
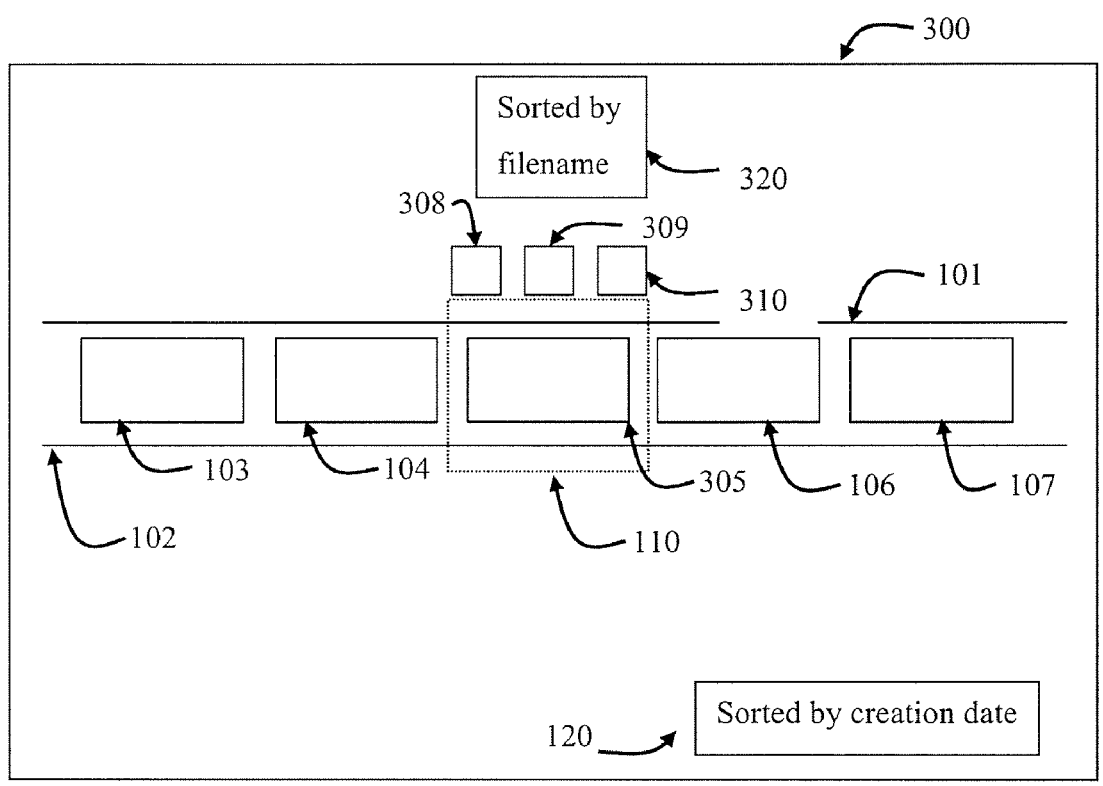
FIG. 3 shows a schematic view of a third approach for the display of an alternate sort order on a given list element, in which the alternate sort adjacent elements are displayed horizontally.

FIG. 3 shows a GUI 300 for the display of an alternate sort order on a list element, in which the alternate sort adjacent elements are displayed vertically and horizontally. In the GUI 300, one of the images 305 in the list has an alternate sort order displayed. Three reduced-size images 308, 309 and 310 are displayed horizontally side-by-side, vertically above the image 305. Two of these, being the images 308, 310, are the alternate sort adjacent elements. There is provided an indication 320 as to what the alternate sort order represents. The three images 308-310 give an indication as to what the line of images would look like if the user changed the primary sort order 120 to the order specified by the alternate sort order 320, in this example, called "filename". That is, the image 308 on the left corresponds to the image that would be displayed to the left of the image 305 in the alternate sort order 320, and the image 310 on the right corresponds to the image that would be displayed to the right of the image 305 in the alternate sort order 320. The image 309 in the middle is the same as the image 305, but at a smaller size and serves to reinforce the appearance of the alternate sort order.

The GUIs of FIG. 2 and FIG. 3 may be modified by the addition of further alternate sort orders for a given item. With reference to FIG. 3, this may be achieved by displaying an additional set of items above the images 308-310, or below the image 305. Further, colour-coding of the sort orders may be used. For example a rectangle of a particular color between the lines 101 and 102 can indicate a particular sort order, and color-coding of items 308-310 by the addition of a border containing a representative color around them to indicate the alternate sort order. The color-coding scheme may enhance or replace the explicit display of the sort orders 120 and 320. Other variations may include the addition of further alternate items in the alternate sort order to the left of 308 and to the right of 310, the use of transparency on items in an alternate sort order to the left and right of item 309, or the omission of item 309 altogether.

In each of the GUIs 200 and 300, when the image 204 or 305 that has an alternate sort order is selected, the user may select a single button or key as part of the user interface to change the (primary) sort order of the images in the "filmstrip", to the alternate sort order 220 and 320 displayed on the image 204 and 305. This effectively swaps the display of the sort orders.

In each of the GUIs 200 and 300, it is appropriate to first decide which images in the list will have alternate sort orders displayed. It is undesirable for all the images to have alternate sort orders displayed, as the display of the alternate sort orders in the GUIs 200 and 300 adds visual clutter to the display. Desirably, the number of alternate sort orders displayable is limited to a fixed maximum number as chosen by the user in advance, or otherwise previously determined by the GUIs 200, 300.

Figure 4:
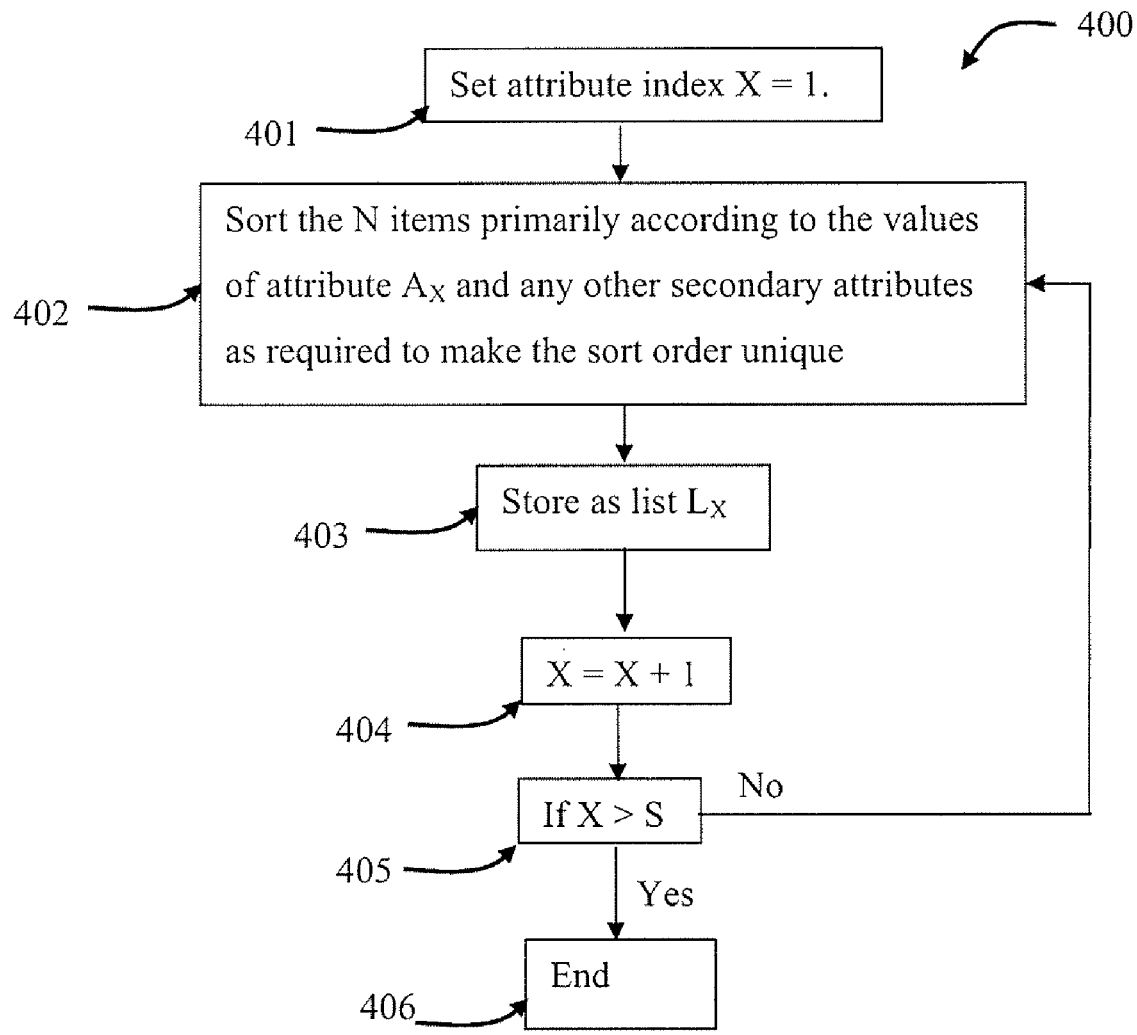
FIG. 4 is a schematic view of a flow chart of a method by which a set of alternate sort orders is generated for a list of items.
Figure 5:
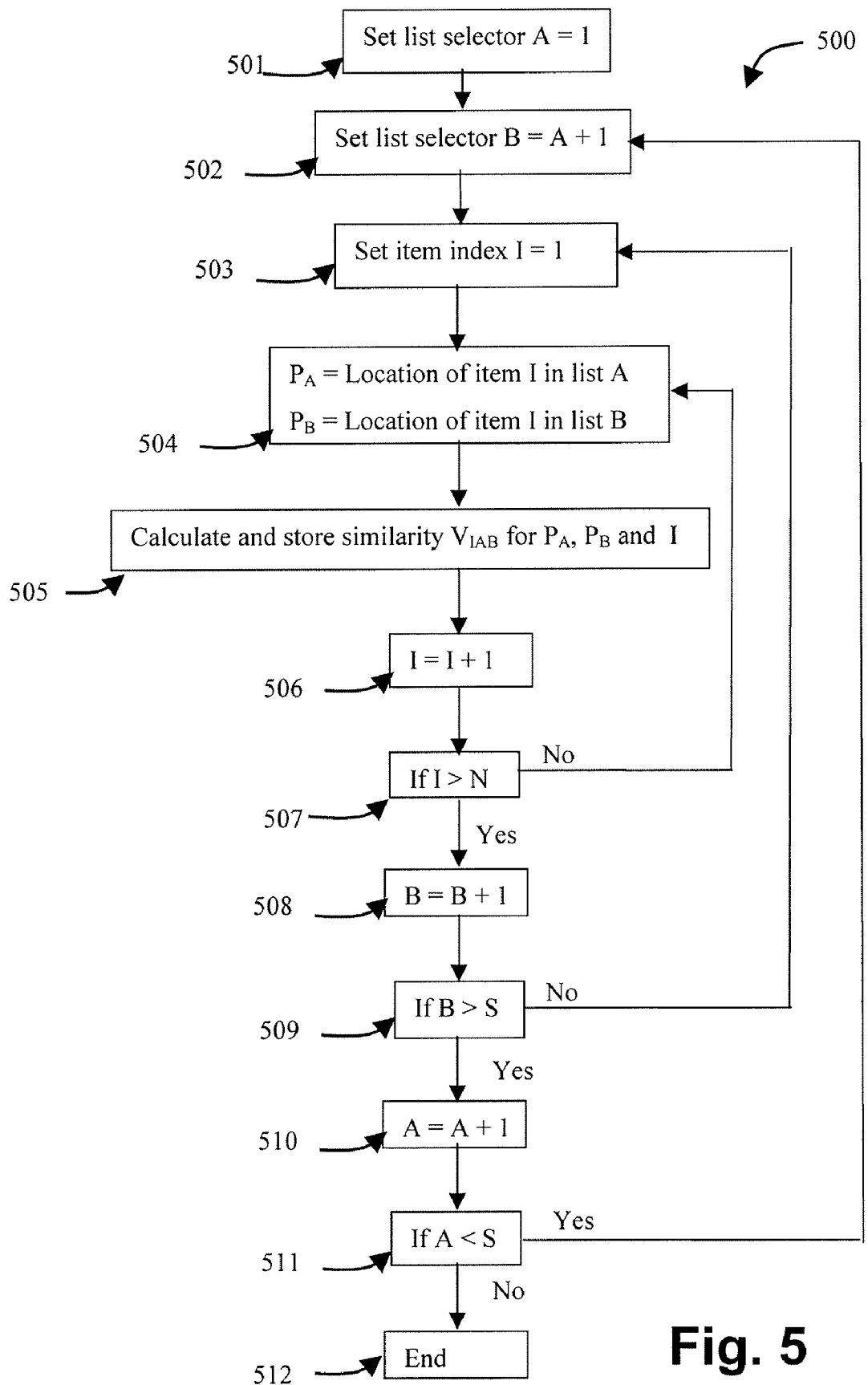
FIG. 5 is a flow chart showing details of FIG. 4, wherein the sequence by which a set of alternate sort orders is generated for a given single list item.
Figure 6:
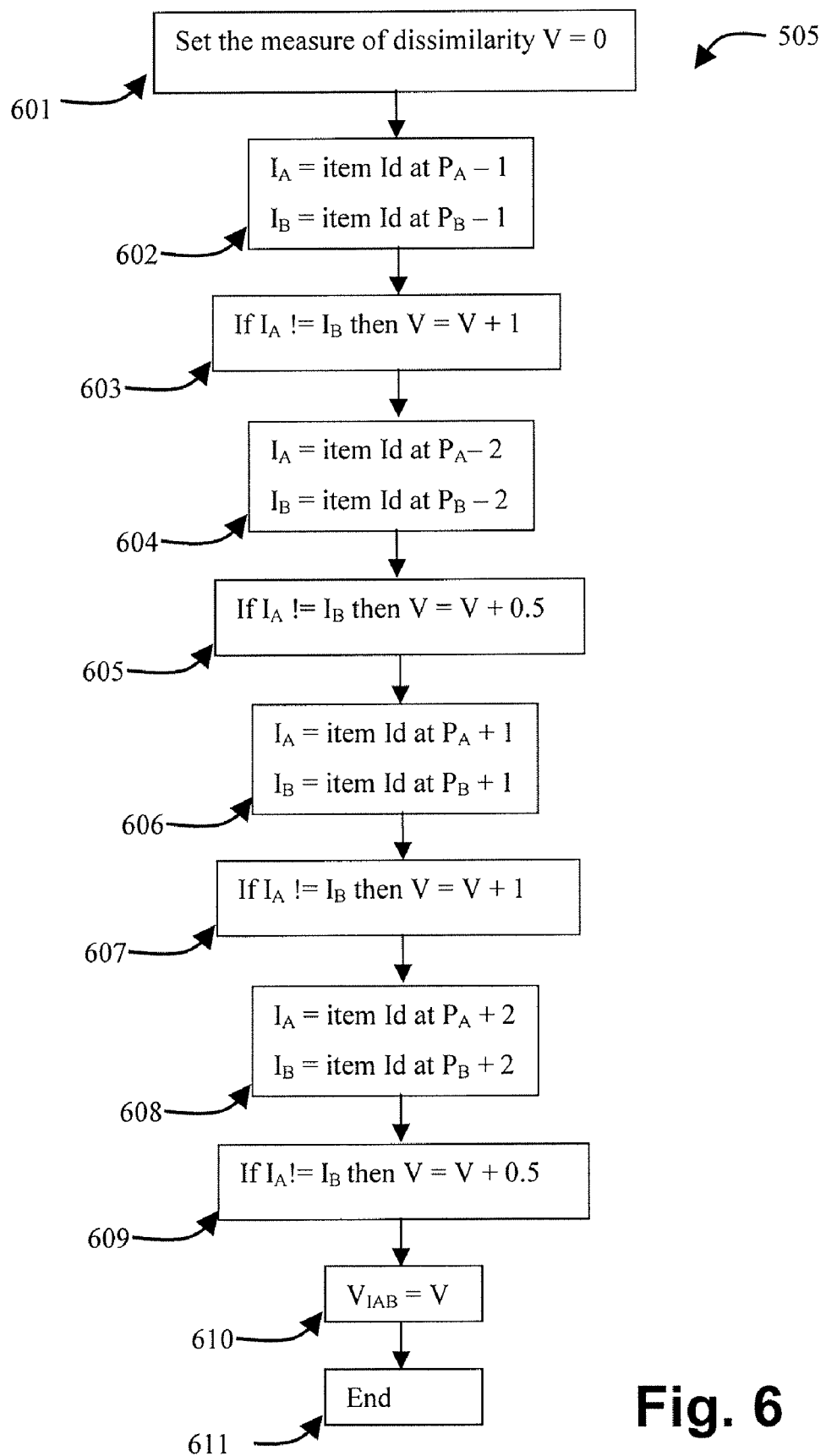
FIG. 6 is a flow chart of a method by which two sort orders of a list are given a measure of dissimilarity in the vicinity of a given element.

A method for deciding which images are interesting—w i.e, which images should display alternate sort orders—is described in the flowcharts of FIGS. 4, 5 and 6. The procedures are desirably performed once before any alternate sort orders are displayed. The results of the procedures of FIGS. 4, 5 and 6 may be stored, and the stored results used when determining which alternate sort orders should be displayed, so that the procedure does not have to be performed every time the GUI displays alternate sort orders. Adding further images to those available for viewing necessitates that the procedure of FIGS. 4, 5 and 6 be performed again. However various optimizations may be performed by specifically analyzing only the added items and the existing items in the list that are nearby the added items. This is desirably performed by assessing a measure of similarity of the specific items. The present inventors have determined that what may make an alternate sort order interesting for viewing is the extent of its similarity to the sort order already being viewed. Sometimes the user may wish to see images in the alternate sort order that are similar. In browsing situations, where a user may wish to cover many items quickly, the user may prefer to see images in the alternate sort order that are generally dissimilar. The measure may therefore be a measure of dissimilarity. According to a preferred procedure described with reference to FIG. 7, a Dissimilarity number is determined to is used to identify items for presentation in the alternate sort order(s).

Each item in a collection of N items has a unique identifier, $I_1 \ldots I_N$. Associated with the collection items are S different attributes, $A_1$ to $A_S$. These attributes are ordered according to a preference selected by the user, or a predetermined order. Each attribute is used as a key or sort criterion to determine a sort order. It may be the case that for some of these attributes, using that attribute alone will not create a unique sort order. Since consistency in the results of a sort affects the navigation of the items by the user, further (secondary) attributes may be used to create a unique sort order for the original (primary) attribute. The order in which the additional (secondary) attributes are applied may be determined at run-time, or predetermined. Preferably, the semantics and likely values of each attribute are predetermined, and for each primary attribute, the sequence of secondary attributes is carefully chosen. Further preferably, each sequence will be terminated by the same final secondary attribute, which would produce a unique sort if used in isolation. This might be the date and time, or a database identification, or similar attribute for the items in the collection. Note that the sequences of secondary attributes for the primary attributes need not be the same length. For each attribute, the items may be ordered primarily according to each attribute value (and then further sub-sorted by the remaining secondary attributes until each image is uniquely sorted) to form sorted lists, $L_1 \ldots L_S$ where each list contains all N items. A dissimilarity value may be allocated to each item for each combination of two sorted lists, $(L_A, L_B)$ where $1 >= (A, B) >= S$. Each item may therefore have $S(S-1)/2$ dissimilarity values when all sorted list pairings are calculated. Each such value is referred to as $V_{IAB}$, the dissimilarity value for item I for the combination of list A and list B.

FIG. 4 shows a flowchart for a method 400 of establishing the sorted lists $L_1 \ldots L_S$. In a first step 401 an attribute index X is set to 1, to thereby select an initial attribute $A_1$. In the step 402, the N items of the collection are sorted primarily according to the values of the selected attribute, and then with further attributes according to the sequence for $A_X$. In step 403, the list $L_1$ is stored for future access. In step 404, the attribute index is incremented. In the next step 415, a check is performed if all attributes have been selected, in which case the sorted list generation is complete. Otherwise step 405 returns to step 402 to form the next list.

FIG. 5 shows a method 500 for calculating the dissimilarity values $V_{IAB}$. In a first step 501 a first sorted list index A, is set to 1. In step 502, the second list index B, is set to A+1. Step 503 follows, where the item index I is set to 1. Step 504 operates then to find the item for index I in both of the sorted lists $L_A$ and $L_B$. These positions are termed $P_A$ and $P_B$ and are in the range 1 to N. In step 505 which follows, the dissimilarity value for item index I and lists A and B is calculated. The details of this operation are described in detail with reference to FIG. 6. In step 506, the item index I is incremented. Next, in step 507, a check is performed to determine if all items have been processed. If not, the method 500 returns to step 504, and otherwise the method proceeds to step 508. Step 508, the second sort list index is incremented. In step 509, a check is made to determine if all second sort lists have been processed. If not, the method 500 returns to step 503, and otherwise step 510 is implemented. In the tenth step 510, the first sort list index is incremented. Step 511 then checks to determine if any first sort lists are yet to be processed. If so, the method 500 returns to step 502, and otherwise the method 500 ends at step 512 as all dissimilarity values have been calculated.

A preferred procedure for determining a measure of dissimilarity $V_{IAB}$, given a combination of sort orders and an item in the list of items, is shown in FIG. 6, this being the method of step 505 of FIG. 5. Note that in FIG. 6, when referring to locations near $P_A$, such as $P_A-1$, calculations are performed to wrap the list. For example, the item previous to the first list item is the last list item.

In a first step 601 of FIG. 6, the dissimilarity measure V is set to 0. Step 602 follows where a unique identifier $I_A$ for the item at location $P_A-1$ in the sorted list $L_A$ is obtained. If $P_A$ equals 1, $P_A-_1$ is replaced by S. Also, the identifier $I_B$ for the item at location $P_B-1$ in the sorted list $L_B$ is obtained. If $P_B$ equals 1, $P_B-_1$ is replaced by S. In step 603, these identifiers are compared and if found to be unequal, V is incremented by 1. In the following step 604, the identifiers are obtained for locations $P_A-2$ and $P_B-2$. If a position index is less than 1, S is added to that index, causing the list to wrap. In step 605, the dissimilarity value V is incremented by 0.5 if these identifiers are not equal. Steps 606 to 609 then repeat the same process for P+1 and P+2. If a position index is greater than S, then S is subtracted from that index, causing the list to wrap. The final dissimilarity value V is assigned to $V_{IAB}$ in step 610 and is seen to represent an accumulation of dissimilarity values of pairs of items from the two sorted lists being compared. The contributions of the dissimilarity values are based upon simple weights (i.e., 0, 1, 0.5) in this example, but may be modified using some other form of calculation. The method of step 505 then ends at step 611.

Other procedures may be used for calculating the measure of dissimilarity. Those procedures may use more of the adjacent neighboring items, or give different penalties to the measure of dissimilarity for any images that are the first or last item of the list in an alternate sort order. In addition, instead of assigning numbers based on the images being different, it is possible assign scores based on how different they are according to that sort order. For example, when comparing images in the sort order of "creation date", rather than simply assigning a score based on how far the images are from $I_X$ and whether the images are different, it is possible to assign a different penalty depending on the difference between the two creation dates.

Figure 7:
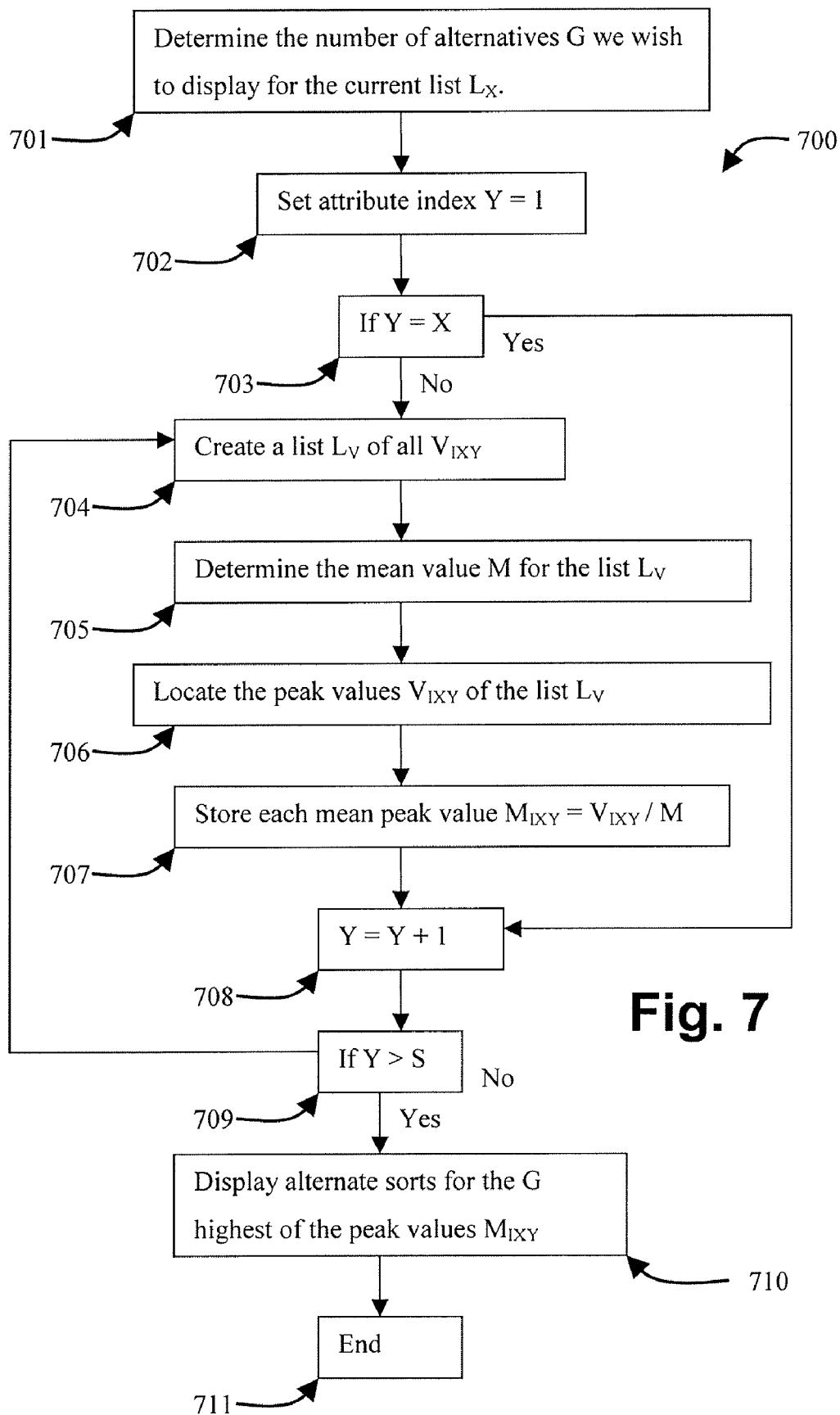
FIG. 7 is a flow chart of a method by which a subset of alternate sort orders are chosen for display, when displaying the list.

At this point of processing, the methods of FIGS. 4-6, have delivered a set containing measures of dissimilarity $V_{IAB}$. The procedure detailed in FIG. 7 shows a preferred method 700 for choosing which alternate sort orders to show. Other methods may alternatively be used, and such methods may include displaying the best alternate sort order for the image 105 that is currently selected 110, and updating the alternate sort order displayed every time the currently selected image changes.

Once the system has collated the set of measures of dissimilarity, as detailed in FIGS. 4-6, it can display alternate sorts in the manner as shown in FIG. 2 or FIG. 3. The procedure by which the system decides which alternate sorts to display, and on which items, is shown in a method 700 illustrated in FIG. 7. In a first step 701 of the method 700, the number of alternatives G desired to be displayed for the currently displayed list $L_X$ is determined, where X is the attribute index for the sort order for the list. This number of alternatives G may be a fixed number as chosen by the user in advance, or otherwise previously determined by the system. The number may alternatively be a percentage of the number of items in the list.

In the next step 702, the attribute index Y is set to 1.

In step 703 since the intention is to find alternatives which follow, a determination is made of whether Y is equal to the attribute index of the currently displayed list. If Y=X, the method 700 skips to step 708. Otherwise, step 704 follows.

In step 704, a list is created of all the dissimilarity measures that have been calculated between the current list and the list corresponding to attribute Y. This will be either $V_{IXY}$ or $V_{IYX}$ for all values of I. The list of dissimilarity measures is arranged in order of increasing I.

In the next step 705, a mean value M of the dissimilarity measures is determined by summing all the V and dividing by N, the number of elements in the list.

In the next step 706, the locations of any peak dissimilarity values of the list are identified. A peak dissimilarity is one that has no higher dissimilarity values to the left or the right in the list. A peak that contains several highest dissimilarity values desirably has the centremost value chosen as the peak. This shows us an area where there is greater dissimilarity between the two lists $L_Y$ and $L_X$, and which is therefore a candidate for showing as an alternate sort order.

In the next step 707, the value of the peak is divided by the mean value of the dissimilarity measures, in order to evaluate how much the peak is clear of the average dissimilarity. This averaged result is stored as a candidate for display. The extent by which the peak exceeds the average indicates the relative strength of that peak. This may be used as a ready means by which the peaks can be compared to thereby permit appropriate selection of sort orders for display.

In the next step 708, Y is incremented.

In step 709 which follows, a test is performed to determine whether Y is greater than the number of sortable attributes. If not, there are more attributes to process, and the method 700 returns to step 704. Otherwise the method 700 has now found peaks in the dissimilarity measures comparing the current list with all the other lists, and so proceeds the next step 710.

In step 710, the set of averaged dissimilarity values is examined to find a number of peaks less than or equal to G, that can then be displayed as alternate sort orders on the current list. For each peak, the value I at which the peak occurred is known, as is the alternate attribute Y that determines which alternate sorted list $L_Y$ that should be displayed.

The GUI can then display the items at $P_Y-1$ and $P_Y+1$, having adjusted these indices for list wrapping if necessary, in the alternate sorted list $L_Y$, attached to item I in the currently displayed list $L_X$. For example in FIG. 2, the item $P_Y$ is represented by the image 204, $P_Y-1$ is the image 208, and $P_Y+1$ is the image 209. In FIG. 3, the item $P_Y$ is represented by the image 305 and the image 309, $P_Y-1$ is the image 308, and $P_Y+1$ is the image 310.

The procedure detailed in FIG. 7 is a preferred embodiment of the procedure for displaying alternate sort orders. Many variations may be made, including, but not limited to:

(i) adjusting the transparency of the alternate sort order displayed 308, 309, 310, 320 depending on the measure of dissimilarity S;

(ii) performing an additional step of reducing the number of visible alternate sort orders on the display screen 300 if the number is large for the current display fading out the more similar of the alternate sort orders as the items on the display scroll, so as to reduce visual clutter;

(iii) adding further alternate images for display;

(iv) highlighting images that are particularly responsible for the alternate sort order being displayed; and (v) performing an additional step of increasing the number of visible alternate sort orders on the screen 300 if the number is small for the current display, so as to always have some alternate sort order on display.

In addition, the method 700 described for selecting the alternate sort orders by determining peaks is quite simple. Other statistical analysis might be applied to the dissimilarity measures to determine such things as which sort order comparisons are the most useful and interesting. For example, spectrum or statistical analysis may be performed on a set of dissimilarity measures to determine the weighting of each peak, rather than merely dividing each peak value by the average dissimilarity value. It further may be preferable to use alternate sort orders that have fewer peaks over alternate sort orders that had many peaks.

Figure 8:
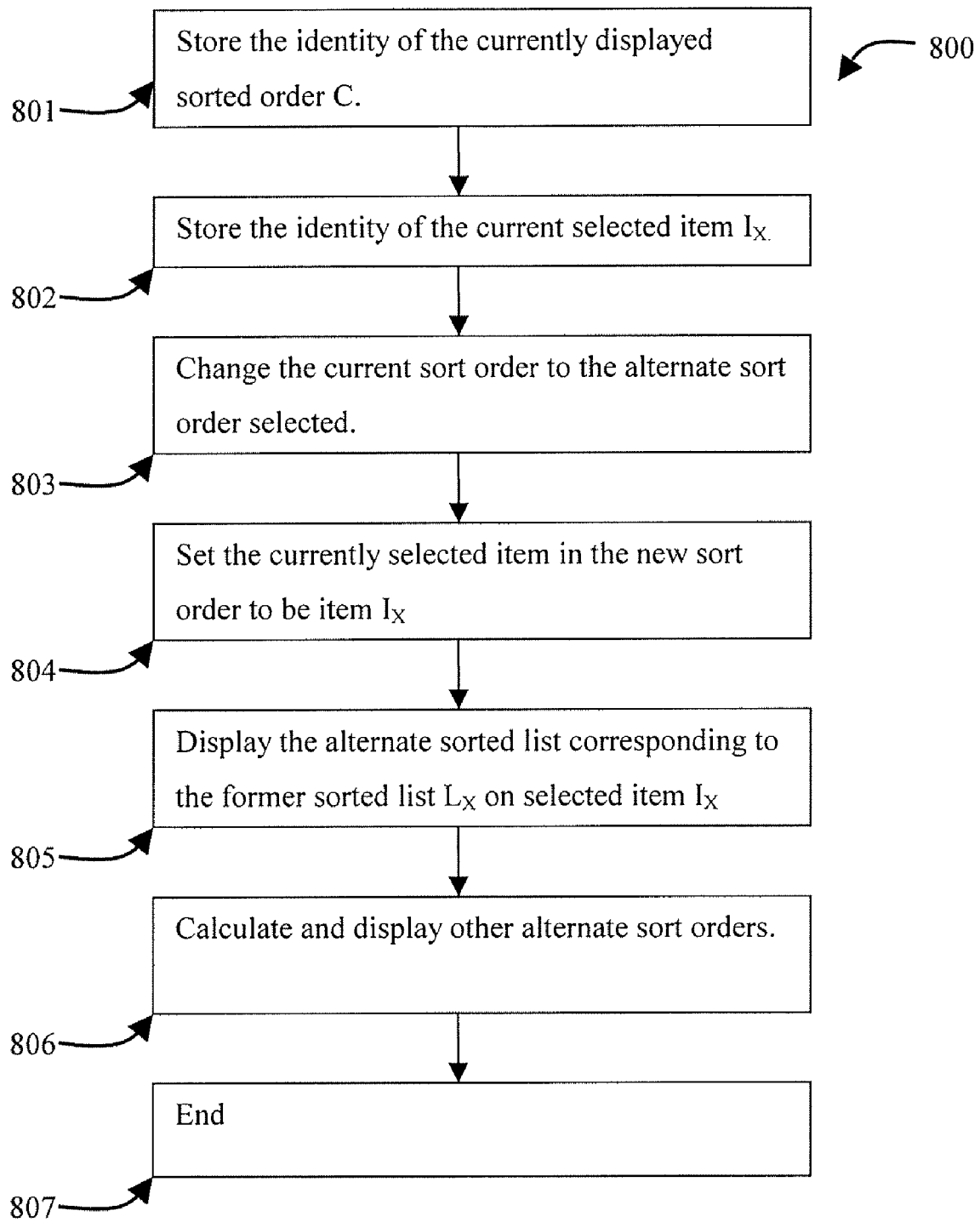
FIG. 8 is a flow chart of a method by which a sort order may be changed to an alternate sort order.

Once the alternate sort orders are displayed on a list, the user may proceed to browse the list and may, at some point, decide to take advantage of one of the alternate sort orders by selecting it by use of the remote-control 1150 or other controlling means, such as the mouse 1103. It is intended that the selection of an alternate sort order should be as simple as possible, and preferably requires a single button-press on an easily accessible button, to encourage the ease of browsing. Once an alternate sort order has been selected in such a way, a procedure 800 as shown in FIG. 8 is implemented.

In the first step 801, the identity of the currently displayed set order C is stored.

Step 802, then stores the identity of the currently selected item $I_X$.

In step 803, the current sort order is changed to the alternate sort order selected.

This involves the removal of the current list of displayed items and any alternate sort orders currently showing in the GUI, and reordering the list of displayed items according to the alternate sort order selected.

In the next step 804, the currently selected item in the new sort order is set to be item $I_X$. The selected item $I_X$ preferably appears stationary and unchanging throughout the change of sort orders, so that the user has a visual stationary reference point for orientation. The GUI may show an animation for the transition between the two displayed sort orders performed in step 703 and 703 to further represent to the user as to what is happening.

In the next step 805, the alternate sort order corresponding to the former sort order C on item $I_X$ is displayed. This step is important as it allows the user to easily revert to the former sort order.

In the next step 806, the method 800 calculates and displays other alternate sort orders as detailed in FIG. 6, taking into account and leaving in place the alternate sort order created during step 705.

The method 800 then ends at step 807. The user may continue to browse the list displayed in the new sort order, and may choose further alternate sort orders as described earlier.

FIGS. 9A-9C diagrammatically shows an example method of determining dissimilarity values. FIG. 9A shows items are arranged according to two sort orders in 901 and 902. The displayed list of items 903 in the GUI of FIG. 9B is then arranged horizontally according to sort order 1 901. For each item 904 in the displayed list 903, the adjacent items according to sort order 2 may be displayed vertically adjacent as in 905. For example, item A in the list 904 (sort order 1) is seen to be adjacent items E and F in sort order 2. Accordingly, items E and F are represented vertically adjacent item A in the list 904. The dissimilarity values are calculated for each item in sort order 1-903, which are indicated at 906. FIG. 9C shows a variation of a GUI 907 where items with a large dissimilarity value (i.e., having a high relative peak strength, in this case the value 2) have their adjacent items displayed vertically, according to sort order 2. It will be further apparent from FIGS. 9A-9C, that in a situation where, for example only two sort orders 901, 902 are actually determined for the collection of images, such a situation can result in the display of six alternate sort orders 905 (FIG. 9B) or three alternate sort orders (FIG. 9C).

FIG. 10 is a diagram showing a method for calculating dissimilarity values. Each of the common items in sorted lists 1 and 2 are located and the dissimilarity values calculated using adjacent items. This is shown for each item in the collection or set, for each of the two sort orders. For example, with item A being the focus item of the sort orders, there is no dissimilarity value for item A, since the items are identical (absolutely similar). The first adjacent pair of items in one direction along the two sort orders are both item F. Since again there will be no dissimilarity value, a weight of 0 is assigned to this pair. In the opposite direction, the pair is formed by items B and E. The dissimilarity value determined from these items is given a weight of 1. The next adjacent pair of items along the sort orders in that same direction are items C and B, whose dissimilarity value is given a weight of 0.5. As seen in FIG. 10, summed or accumulated dissimilarity values are determined from dissimilarity values of multiple progressively adjacent pairs of items from the lists being compared. The same consideration applies for the same sort orders when focused on other items in the collection, as illustrated in FIG. 10. Significantly, the range in the sum of the weights, from 0.5 to 2.0 indicates those sort orders that, when centered on certain items, produce the greatest (weighted) difference from the others, and hence may be considered to reveal a more desirable range of images for possible selection by the user.

Figures 12, 13:
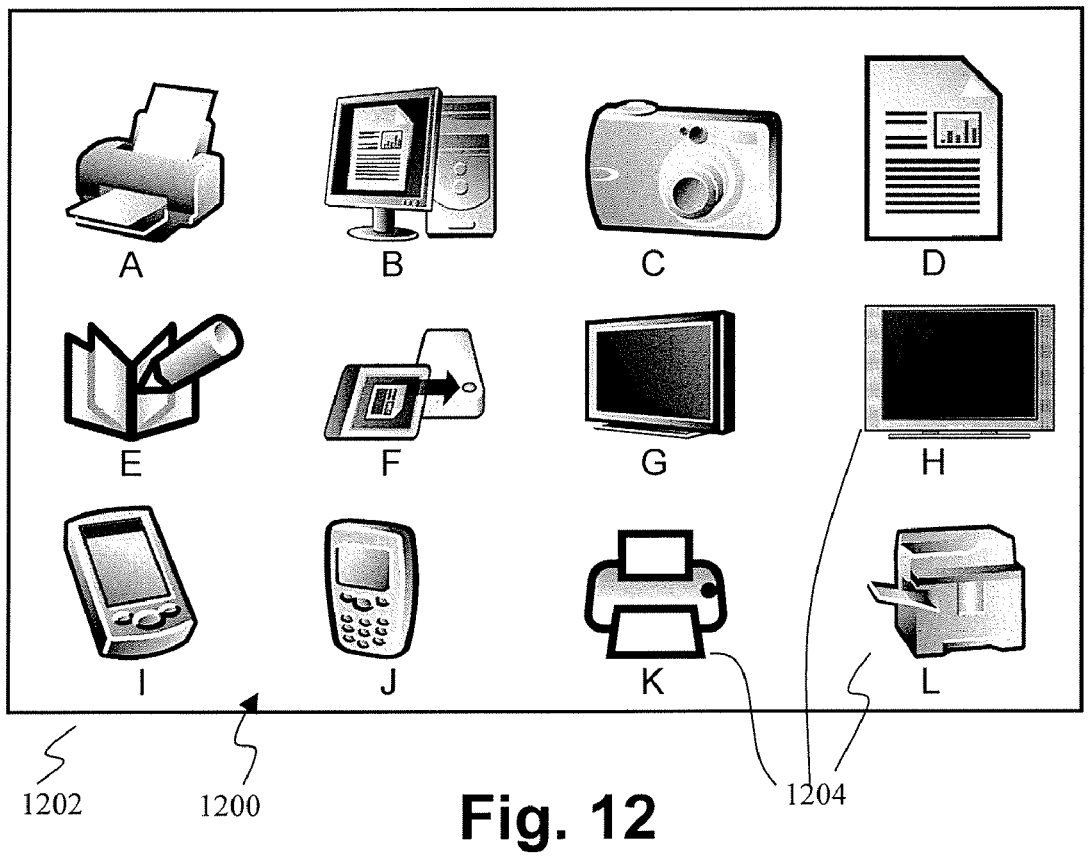
FIG. 12 illustrates an exemplary but limited collection of images.
FIG. 13 shows a tabular representation of metadata associated with the collection of FIG. 12 and from which a number of sort orders may be inferred.

FIG. 12 shows a collection 1200 of images 1204 entitled A-L respectively that may be stored within or accessible by the computer system 1100. The collection 1200 has a number of common attributes (seen in FIG. 13) and may be a subset of images derived from a larger collection (superset) of images, where the all images in the superset do not necessarily have common attributes. FIG. 12 shows the collection 1200 as such may be seen within a window or display area 1202 of a file browser, such as Windows™ Explorer™ manufactured by Microsoft Corp. of USA. Specifically the representation of the images A-L 1204 within the window 1202 is consistent with a "thumbnail view" form of display, often used for images. In FIG. 12, the title A-L of each image is indicated for illustrative purposes only to aid the reader of the present document to interpret related FIGS. 13 and 14.

FIG. 13 shows an alternate representation of the collection 1200 such as that encountered using a "details view" 1300 within Windows™ Explorer™. The detailed view 1300 is instructive of some metadata that may be associated each image in the collection 1200. Particularly, the view 1300 clearly represents attributes of the images such as the title 1302, the capture date 1304, the file size 1306 and an average color value 1308 (for example) associated with each image item 1204 of the collection 1200. As will be appreciated from the description above, the attributes 1302-1308 may each be used to define corresponding sort orders relevant for the display of the images within a specialist image browser in accordance with the present disclosure. As seen in FIG. 13, the view 1300 is shown sorted according to the title attribute 1302, but may be displayed by resorting based upon any of the other attributes 1304-1308.

Figure 14:
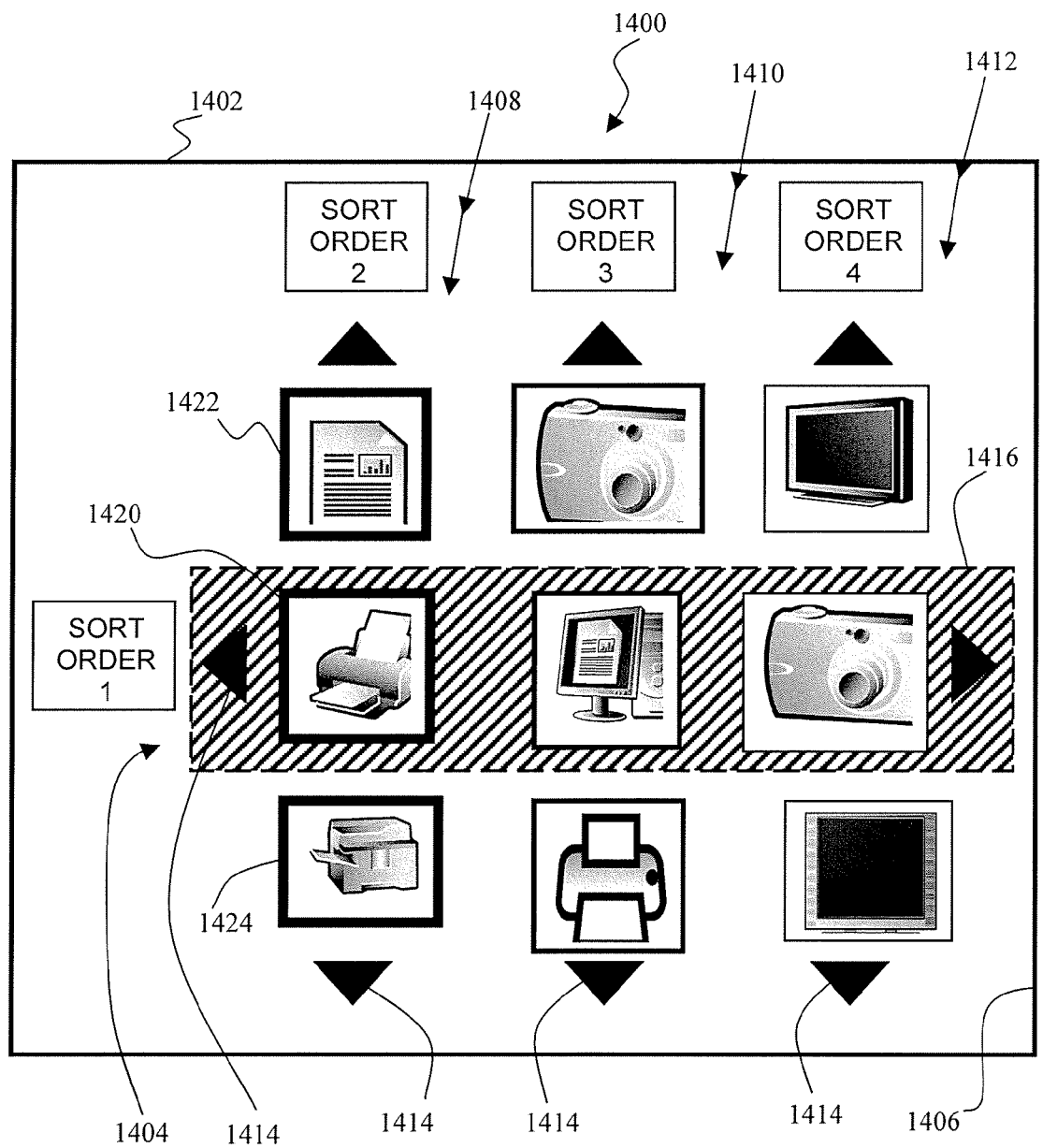
FIG. 14 shows a further GUI according to the present disclosure in which for each item in a primary sort order displayed, a corresponding alternate sort order is also displayed for the collection of FIGS. 12 and 13.

FIG. 14 shows an alternate GUI 1400 according to the present disclosure for displaying a number of sort orders of items in a collection of images. The GUI 1400 is formed within a display area 1402 and includes a representation of a first (primary) sort order 1404, displayed in a horizontal line of thumbnail image representations. In this specific example, the number of images represented in the primary sort order is limited to three. Depending upon the size of the display area 1402, the number of images may be increased or decreased. In this example, the primary sort order 1404 is based upon the title of the image in the collection 1200, being the attribute 1302, and is seen to display images A, B and C from FIGS. 12 and 13. As seen in FIG. 14, the primary sort order 1404 is also indicated by a coloured background 1416.

In FIG. 14, since the primary sort order 1404 displays three items, the GUI 1400 is configured to display a further (alternate) sort order associated with at least one, and preferably each, of the items of the primary sort order 1404. As such, alternate sort orders 1408, 1410 and 1412 are displayed and perpendicularly (vertically) arranged relative to the primary sort order 1404. In this example, each of the alternate sort orders 1408, 1410 and 1412 correspond to each of the remaining attributes respectively of the metadata 1300 shown in FIG. 13. Specifically, sort order 2,1408 is based upon the capture date of the image. A corresponding particular image 1420 in the primary sort order 1404 is image A, having a capture date of 21 May 2004. Accordingly, the alternate sort order 1408 is "centered" upon that date and displays items from the collection 1200 that are sorted adjacent item A in the capture date order. Those items are image D (22 May 2004) and image L (17 Mar. 2006), exemplifying the preferred "wrap-around" nature of the sorted lists discussed above. As such those sorted adjacent items D and J from sort order 2 are displayed physically (in this case perpendicularly) adjacent (1422, 1424 respectively) item A in the GUI 1400.

Sort order 3, 1410 is based upon image size and is again "centered" upon the corresponding image from the primary sort order 1404, in this case image B (106 kB). As such, the sort order 1410 will display images have sizes adjacent image B. This is seen from FIG. 13 to be image K (95 kB) and image C (251 kB), again exemplifying the wrap-around.

Sort order 4, 1412 is based upon an average color value, for example obtained by summing all pixels values for red, green and blue data (in the range 0-255) in a image, and dividing by 3 and by the number of pixels, thus providing a numeric average that may be of some assistance in image browsing. Again, this sort order is centered upon the corresponding positioned image from the primary sort order, in this case image C (having an average color value=199). As such the sort order 1412 will display images having adjacent sorted color values, in this case image G (204) and image H (189).

As can be seen in FIG. 14, image C is displayed twice, merely as a coincidence of the metadata values of its attributes and the selection of the primary sort order 1404. Like the other arrangements described, each of the sort orders has associated scrolling icons 1414 that permit items in the corresponding sort order to scroll. In a preferred implementation, as any one of the sort orders 1404, 1408, 1410 and 1412 are scrolled, the other sort orders are re-displayed according to their corresponding sort order but are based upon the location in the corresponding sorted list of the item that has be scrolled in the scrolled sort order.

In the example of FIG. 14, the primary sort order 1404 is horizontally arranged and the alternate sort orders 1408, 1410 and 1412 are further represented to indicate the extent of "difference" from the primary sort order 1404. In this example, the borders surrounding the alternate sort orders are modified in thickness to indicate to the user the relative difference or peak strength in comparison with the primary sort order. As seen the sort order 1408 has items with a very thick border, the sort order 1410 has a medium thickness boarder and the sort order 1412 has a thin boarder. Other approaches may be used indicate any relative difference, such a colored surrounds or varying levels of transparency.

Figure 15:
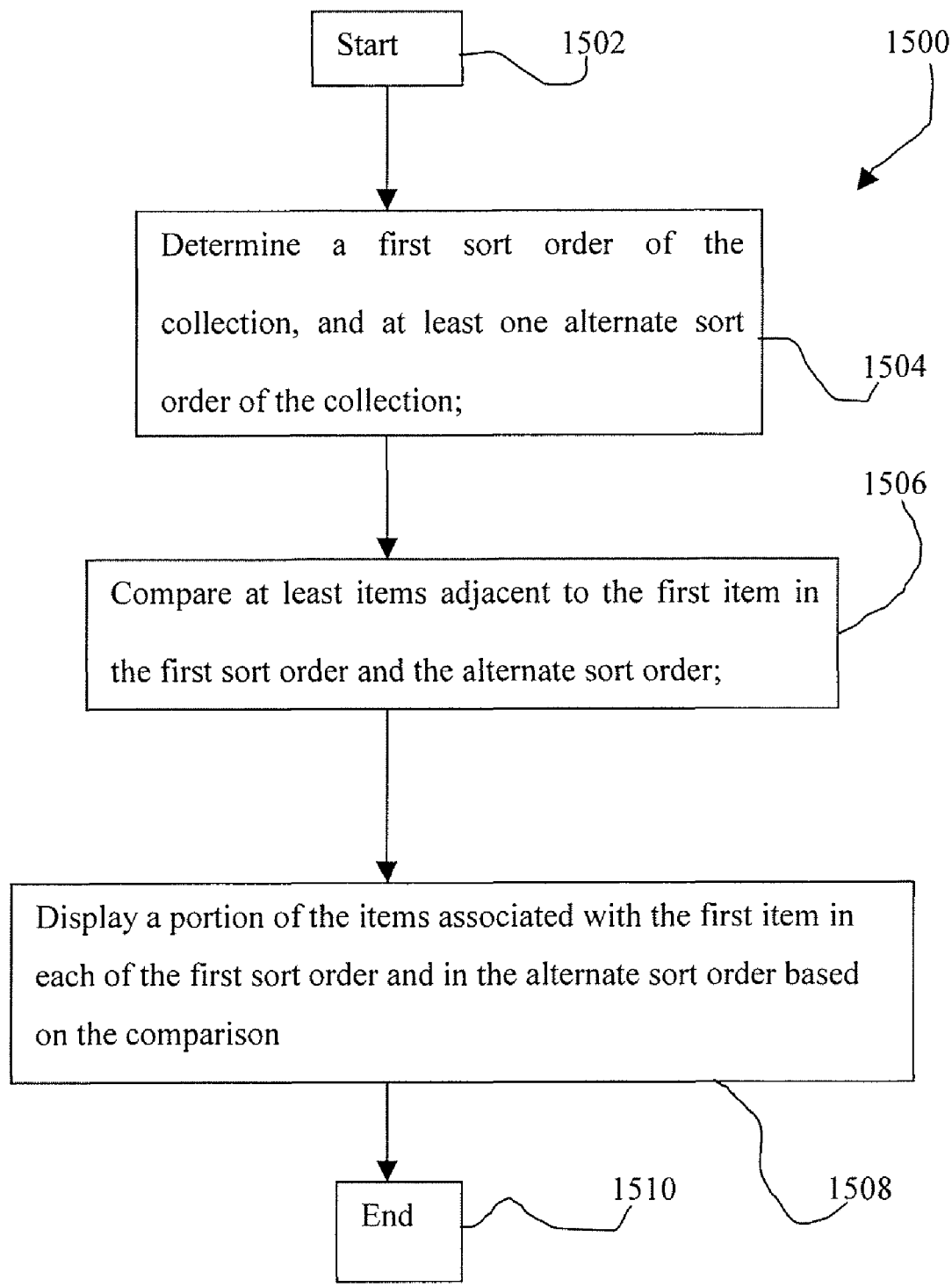
FIG. 15 is a flowchart of a method for displaying items of a collection.

FIG. 15 shows a method 1500 of displaying items from a collection of items including a first item. The method 1500 starts at step 1502 and has a first substantive step 1504 that determines a first sort order of the collection, and at least one alternate sort order of the collection. Step 1506 follows to compare at least items adjacent to the first item in the first sort order and the alternate sort order. Step 1508 then displays a portion of the items associated with the first item in each of the first sort order and in the alternate sort order based on the comparison of step 1504. The method 1500 then ends at step 1510.

Figure 16:
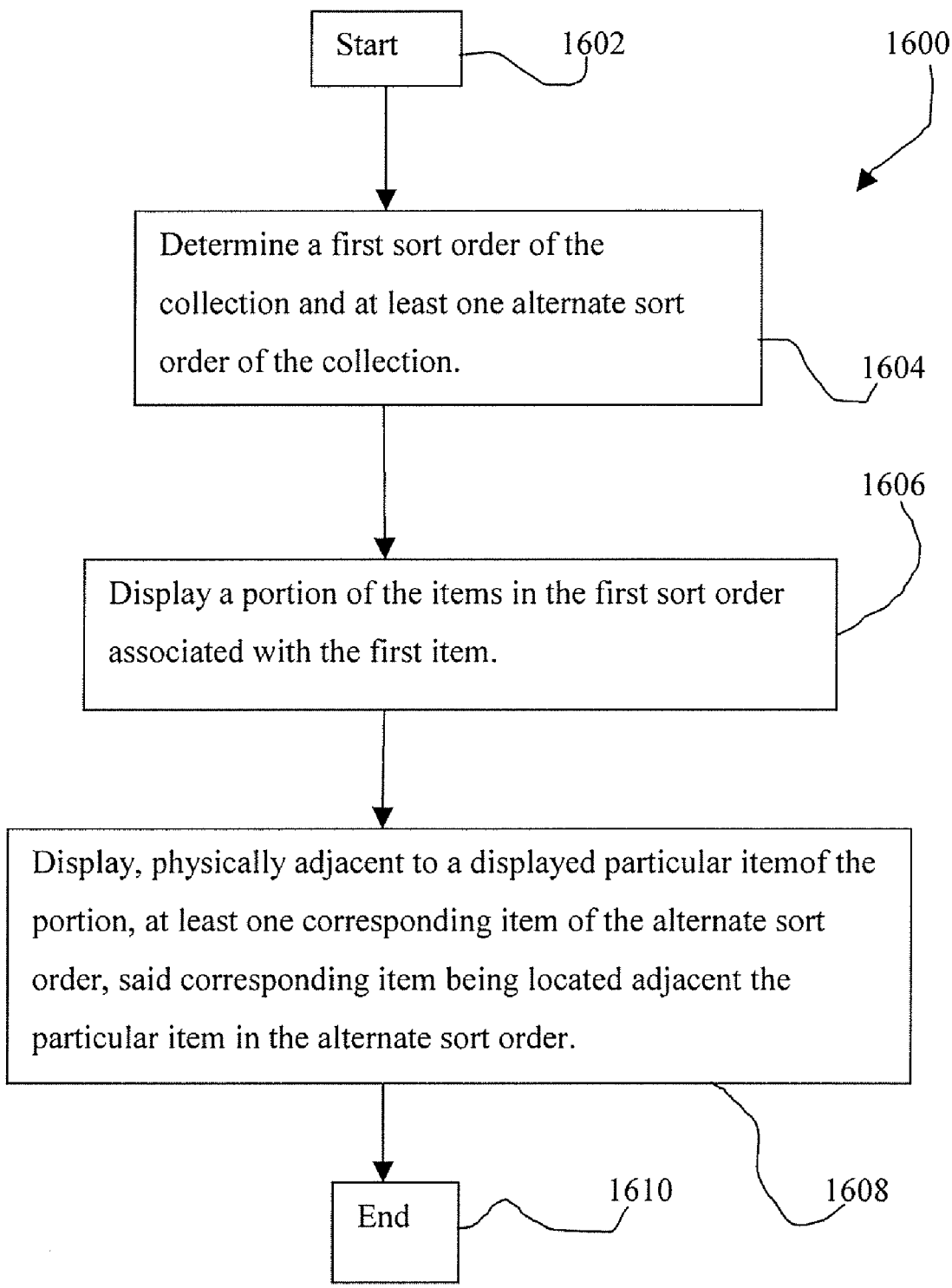
FIG. 16 is a further flowchart of a further method of displaying items of a collection.

FIG. 16 shows an alternate method 1600 of displaying items from a collection of items including a first item. After an entry step 1602, step 1604 determines a first sort order of the collection and at least one alternate sort order of the collection. Step 1606 then displays a portion of the items in the first sort order associated with the first item. Step 1608 then displays, physically adjacent to a displayed particular item of the portion, at least one corresponding item of the alternate sort order, the corresponding item being located adjacent the particular item in the alternate sort order.

INDUSTRIAL APPLICABILITY

The embodiments of the invention are applicable to the computer and data processing industries and particularly where collections of images are required to be browsed. The embodiments offer a form of browsing where different groups of images from the collection are simultaneously displayed, permitting the user to intuitively select certain images or sorted groups to browse further until desired images are identified for further use.

The foregoing describes only one embodiment/some embodiments of the present invention, and modifications and/or changes can be made thereto without departing from the scope and spirit of the invention, the embodiment(s) being illustrative and not restrictive.

I claim:

1. A computer-implemented method for controlling a display controlling apparatus to display an image collection having a plurality of items, the method comprising:
   (a) comparing a second item, which is located adjacent to a first item in a display position when the image collection is sorted in a first sort order, and a third item, which is located adjacent to the first item when the image collection is sorted in a second sort order different from the first sort order, and determining whether a dissimilarity exists between the second item and the third item;
   (b) displaying a first set of items of the image collection including the first item and the second item in the first sort order in a first direction so that the first item and the second item are located adjacent to each other and controlling display of the third item such that the third item is displayed in a second direction different from the first direction when the third item is determined in step (a) to be dissimilar from the second item, and such that the third item is not displayed in the second direction when the third item is determined in step (a) not to be dissimilar from the second item;
   (c) receiving an instruction from a user to change a sort order after the items are displayed based on the control performed in step (b); and
   (d) displaying, in response to the instruction of step (c), a second set of items of the image collection including the first item and the third item in the second sort order in the first direction while maintaining the display position of the first item.

2. A method according to claim 1, wherein items displayed in the first sort order are arranged in a direction perpendicular to items displayed in the second sort order.

3. A method according to claim 1, wherein items displayed in the first sort order are arranged parallel to items displayed in the second sort order.

4. A method according to claim 1, wherein said comparing step comprises determining a measure of similarity between the second item and the third item, the comparison being performed using the determined measure of similarity, and
   wherein the display of the third item in step (d) is performed according to the second sort order and is determined using the determined measure of similarity.

5. A method according to claim 4, wherein determining the measure of similarity comprises determining a dissimilarity value between the second item and the third item, and determining the second sort order based on the detected dissimilarity value.

6. A method according to claim 5, further comprising the steps of:
   calculating a plurality of dissimilarity values of a plurality of pairs of items, each of the plurality of item pairs comprising an item selected from the first sort order and an item selected from the second sort order; and
   summing the plurality of dissimilarity values to form an accumulated dissimilarity value between the first sort order and the second sort order.

7. A method according to claim 6, wherein the accumulated dissimilarity value is determined by summing a plurality of weighted dissimilarity values, the plurality of weighted dissimilarity values being determined based on a plurality of adjacent items in the first sort order and the second sort order.

8. A method according to claim 7, wherein the second sort order is determined using a relative peak strength associated with the plurality of dissimilarity values.

9. A method according to claim 8, further comprising averaging the plurality of dissimilarity values to determine the relative peak strength.

10. A method according to claim 8, wherein step (d) further comprises at least one of the following:
   (A) modifying at least one of a transparency of one of the items of the second sort order or a border surrounding one of the items of the second sort order as a means to indicate the relative peak strength of the dissimilarity measure;
   (B) identifying each of the first sort order and the second sort order using a different color background; and
   (C) identifying each of the first sort order and the second sort order using a corresponding text indication of the sort order.

11. A method according to claim 10, wherein the relative peak strength is used to determine a number of alternate sort orders displayed in step (d).

12. A method according to claim 1, wherein said step of displaying the first sort order in the first direction comprises determining the second sort order from an attribute of the image collection different from an attribute from which the first sort order is determined, both the first sort order and the second sort order comprising the first item.

13. A method according to claim 1, wherein the second sort order comprises at least one of a number of sort orders available for selection as the second sort order, the number of sort orders being determined based upon a plurality of attributes of the items.

14. A method according to claim 1, wherein the first item is determined by a user selection of one of the displayed items.

15. A method according to claim 1, further comprising, in step (b), controlling display such that any item adjacent to the first item, sorted in the second sort order, is not displayed in the second direction when the third item is determined in step (a) not to be dissimilar from the second item.

16. A non-transitory computer-readable storage medium having a program recorded thereon, the program being executable by a computer apparatus to control display of an image collection having a plurality of items upon a display device, the program comprising:

code for comparing a second item, which is located adjacent to a first item in a display position when the image collection is sorted in a first sort order, and a third item, which is located adjacent to the first item when the image collection is sorted in a second sort order different from the first sort order, and determining whether a dissimilarity exists between the second item and the third item;

code for displaying upon the display device a first set of items of the image collection including the first item and the second item in the first sort order in a first direction so that the first item and the second item are located adjacent to each other and controlling display of the third item such that the third item is displayed in a second direction different from the first direction when a dissimilarity is determined to exist between the third item and the second item, and such that the third item is not displayed in the second direction when no dissimilarity is determined to exist between the third item and the second item;

code for receiving an instruction from a user to change a sort order after the items are displayed; and code for displaying upon the display device, in response to the received instruction, a second set of items of the image collection including the first item and the third item in the second sort order in the first direction while maintaining the display position of the first item.

17. A display controlling apparatus for displaying an image collection having a plurality of items, the apparatus comprising:

a determination unit configured to compare a second item, which is located adjacent to a first item in a display position when the image collection is sorted in a first sort order, and a third item, which is located adjacent to the first item when the image collection is sorted in a second sort order different from the first sort order, and determine whether a dissimilarity exists between the second item and the third item;

a display controlling unit configured to display on a display device a first set of items of the image collection including the first item and the second item in the first sort order in a first direction so that the first item and the second item are located adjacent to each other and to control display of the third item such that the third item is displayed in a second direction different from the first direction when the third item is determined by the determination unit to be dissimilar from the second item, and such that the third item is not displayed in the second direction when the third item is determined by the determination unit not to be dissimilar from the second item;

a receiving unit configured to receive an instruction from a user to change a sort order after the items are displayed by the display controlling unit; and a re-display controlling unit configured to control, upon receipt of the user's instruction by the receiving unit, display on the display device of a second set of items of the image collection including the first item and the third item in the second sort order in the first direction while maintaining the display position of the first item.

* * * * *